United States Patent [19]

Watson

[11] 4,302,341

[45] Nov. 24, 1981

[54] GELLED AQUEOUS WELL TREATING FLUIDS

[75] Inventor: Jimmie L. Watson, Duncan, Okla.

[73] Assignee: Halliburton Company, Duncan, Okla.

[21] Appl. No.: 65,165

[22] Filed: Aug. 9, 1979

[51] Int. Cl.$^3$ .................... E21B 43/00; E21B 33/13
[52] U.S. Cl. ........................ 252/8.55 R; 166/291;
260/9; 260/17.5; 260/28.5 R; 260/37 N
[58] Field of Search ............ 252/8.5 A, 8.5 C, 8.55 R,
252/8.55 D; 166/291, 308

[56] References Cited

U.S. PATENT DOCUMENTS

| | | | |
|---|---|---|---|
| 3,256,181 | 6/1966 | Zingg et al. | 252/8.55 |
| 3,483,121 | 12/1969 | Jordan | 252/8.55 |
| 3,557,016 | 1/1971 | Schuppner | 252/316 |
| 3,898,165 | 8/1975 | Ely et al. | 252/8.55 |
| 3,960,736 | 6/1976 | Free et al. | 252/8.55 |
| 4,038,206 | 7/1977 | Karl | 252/8.55 X |
| 4,098,700 | 7/1978 | Hartfiel | 252/8.55 X |
| 4,141,843 | 2/1979 | Watson | 252/8.55 |
| 4,175,042 | 11/1979 | Mondshine | 252/85 X |

FOREIGN PATENT DOCUMENTS 668844  8/1963  Canada .............................. 252/8.55

*Primary Examiner*—Herbert B. Guynn
*Attorney, Agent, or Firm*—John H. Tregoning; Robert S. Nisbett; Thomas R. Weaver

[57] ABSTRACT

Gelled aqueous fluids, solid blends for forming such fluids and methods of using the fluids for treating wells are provided. The gelled fluids are stable over a broad temperature range and are comprised of water, a first hydratable polymer for increasing the viscosity of the fluid to a desired level at temperatures within a first lower range and a second hydratable polymer for maintaining the viscosity of the fluid at temperatures within a second higher range.

9 Claims, No Drawings

GELLED AQUEOUS WELL TREATING FLUIDS

In the treatment of wells during and after they are drilled, it is often necessary to introduce fluids into the wells which are incompatible with each other and/or which are incompatible with other fluids in the wells. Heretofore, in such treatments, it has been common practice to separate the incompatible fluids with a spacer fluid which is compatible with both. For example, in cementing procedures carried out in wells, it is necessary and/or desirable to prevent contact of the cement composition with drilling fluid or mud in the well. Drilling fluids and other well treatment fluids commonly contain fluid loss, weighting and other materials which deposit on surfaces within the well (hereinafter referred to as "filter cake") and contaminate the cement composition whereby the set time, strength and bonding of the cement is adversely affected. Spacer fluids are utilized to prevent the cement composition from contacting the drilling fluid in the well and to remove filter cake from surfaces within the well. Such spacer fluids utilized heretofore have been relatively expensive to prepared and use, have inadequately removed filter cake from surfaces in the well and/or have contaminated one or both of the fluids separated thereby.

In other well treatments it is often necessary to introduce a treating fluid into the well having a viscosity high enough to suspend solid materials such as diverting agents, propping agents, weighting materials, scrubbing materials, etc., therein. While a variety of viscosity increasing agents have been utilized heretofore such as hydratable polymers, such agents generally degrade with increasing temperature and maintain the viscosity of the fluid at the desired level over only a limited temperature range. While complexing and cross-linking agents have been utilized to broaden the temperature range over which hydratable polymers maintain a desired viscosity level, the use of such complexing or cross-linking agents involves complex mixing techniques and is relatively expensive.

By the present invention improved aqueous well treating fluids are provided for use in treating wells which are viscosity stable over a broad temperature range and which are economical to prepare and use. In addition, stable aqueous spacer fluids are provided which are compatible with most other well treating fluids including drilling fluids and cement compositions and which efficiently remove filter cake from surfaces. The viscosity increasing components of the treating fluids as well as scrubbing agents, fluid loss control agents, weighting materials and other agents and materials used can be premixed into blends of solids suitable for use as direct additives to water to form the aqueous treating fluids thereby reducing mixing time and expense.

The aqueous well treating fluids of the present invention are basically comprised of water, a first hydratable polymer or mixture of polymers for increasing the viscosity of the fluids to a desired level at temperatures with a first lower range, e.g., from ambient temperatures to about 150° F., and a second hydratable polymer or polymers for maintaining the viscosity of the fluid at a desired level at temperatures within a second higher range, e.g., from about 150° F. to about 300° F. The treating fluids can include one or more other components such as fluid loss control additives, weighting materials, salts, scrubbing agents, etc.

The aqueous treating fluids of this invention are particularly suitable for use as spacer fluids. A preferred such spacer fluid is comprised of water, an angular particulate material for scrubbing surfaces, a first hydratable polymer for increasing the viscosity of the fluid at temperatures within a first lower range to a level whereby the angular particulate material is substantially suspended in the fluid and a second hydratable polymer for maintaining the viscosity of the fluid at a level whereby the angular particulate material is substantially suspended in the fluid at temperatures within a second higher range.

A variety of hydratable polymers can be utilized in the aqueous treating fluids of this invention including hydratable polysaccharides, hydratable polyacrylates, hydratable polyacrylamides, xanthan gum, and mixtures of such polymers. Hydratable polymers such as guar gum and derivatives thereof, cellulose and derivatives thereof and mixtures of such polymers are particularly suitable for increasing the viscosity of the fluids to a desired level at temperatures within a first lower range, i.e., from atmospheric temperature to about 150° F. Such polymers are immediately hydrated when mixed with water to form a gel, but the gel degrades or deteriorates at temperatures above about 150° F. whereby the viscosity of the fluid decreases.

Hydratable polymers such as locust bean gum are particularly suitable for extending the temperature range over which the viscosity of the treating fluid is maintained at a desired level in that they do not begin hydrating until reaching temperatures of about 150° F. and maintain viscosity at temperatures up to about 300° F.

A preferred aqueous well treating fluid of this invention which is viscosity stable over a broad temperature range is comprised of water, a hydratable polymer which increases the viscosity of the fluid at temperatures in the range of from atmospheric to about 150° F. selected from the group consisting of hydratable polysaccharides, hydratable polyacrylates, hydratable polyacrylamides, xanthan gum, and mixtures of such polymers present in the fluid in an amount in the range of from about 1 to about 90 lbs/1000 gals. of water used, and a hydratable polymer which maintains the viscosity of the fluid at a desired level at temperatures in the range of from about 150° F. to about 300° F. such as locust bean gum and mixtures of such polymers present in the fluid in an amount in the range of from about 0.5 to about 40 lbs/1000 gals. of water used. Such fluid has an apparent viscosity in the range of from about 300 centipoises to about 10 centipoises over a temperature range of from atmospheric temperature to about 300° F. As stated above, the fluid can include a variety of other additives to achieve desired results.

A preferred aqueous spacer fluid of the present invention for use in treating a well is comprised of water, an angular particulate material for scrubbing surfaces in the well present in the fluid in an amount in the range of from about 100 to about 900 lbs/1000 gals. of water used, a hydratable polymer or polymers for increasing the viscosity of the fluid to a level whereby the angular particulate material is suspended therein at temperatures within a first lower range selected from the group consisting of hydratable polysaccharides, hydratable polyacrylates, hydratable polyacrylamides, xanthan gum, and mixtures of such polymers present in the fluid in an amount in the range of from about 1 to about 90 lbs/1000 gals. of water used, and hydratable locust bean gum for maintaining the viscosity of the fluid at such level at temperatures within a second higher range present in the fluid in an amount in the range of from about 0.5 to about 40 lbs/1000 gals. of water used. Such spacer fluid is compatible with most other fluids used in treating wells, has a stable viscosity over a broad temperature range, and brings about better cleaning of well surfaces.

A variety of angular particulate materials can be utilized in the spacer fluid including, but not limited to, nut hulls, sand, perlite, flyash, coal, lignite, galena, and mixtures of such materials. The angular particulate material utilized preferably has a specific gravity below about 2, and most preferably has a specific gravity within from about 80% to about 120% of the specific gravity of the aqueous spacer fluid.

The most preferred angular particulate scrubbing material for use in the aqueous spacer fluids of this invention is particulated nut hulls such as walnut hulls having a size distribution in the range such that a major portion of the material passes through a size 14 mesh screen (U.S. Sieve Series) and is retained on a size 20 mesh screen. Such material is readily suspended in the spacer fluids and brings about improved cleaning of surfaces within wells.

A more preferred aqueous spacer fluid which is particularly suitable as a spacer between drilling fluids and cement compositions is comprised of water, an angular particulate scrubbing material having a specific gravity below about 2 present in the fluid in an amount in the range of from about 150 to about 700 lbs/1000 gals. of water, a hydratable polymer for increasing the viscosity of the fluid at temperatures within the range of from atmospheric temperature to about 150° F. selected from the group consisting of guar gum and derivatives thereof, cellulose and derivatives thereof, and mixtures of such polymers present in said fluid in an amount in the range of from about 1.5 to about 75 lbs/1000 gals. of water and hydratable locust bean gum for maintaining the viscosity of the fluid at temperatures in the range of from about 150° F. to about 300° F. present in the fluid in an amount in the range of from aout 0.75 to about 30 lbs/1000 gals. of water.

The most preferred aqueous spacer fluid of this invention is comprised of water, particulated walnut hulls having a size distribution in the range such that a major portion thereof passes through a size 14 mesh screen (U.S. Sieve Series) and is retained on a size 20 mesh screen present in the fluid in an amount in the range of from about 300 to about 510 lbs/1000 gals. of water, sodium carboxymethylhydroxyethylcellulose present in the fluid in an amount in the range of from about 30 to about 51 lbs/1000 gals. of water, hydroxypropyl guar present in the fluid in an amount in the range of from about 15 to about 25 lbs/1000 gals. of water, and locust bean gum present in the fluid in an amount in the rangeof from about 15 to about 25 lbs/1000 gals. of water. The sodium carboxymethylhydroxyethylcellulose and hydroxypropyl guar are hydrated at temperatures within the range of from atmospheric temperature to about 150° F. to impart a viscosity to the fluid in the range of from about 300 to about 10 centipoises. The locust bean gum does not hydrate until the fluid reaches a temperature of about 150° F. and imparts viscosity to the fluid at temperatures in the range of from about 150° F. to about 300° F. of from about 300 to about 10 centipoises.

In order for the angular particulate material utilized in the spacer fluid of this invention to move within the fluid while the fluid is flowing whereby surfaces are cleaned thereby, the viscosity of the fluid should be maintained at a level in the range of from that level required to suspend a substantial portion of the angular particulate material to a level about 20% thereabove. If the viscosity of the fluid is higher than about 20% above the viscosity required to suspend a substantial portion of the angular particulate material, the material is not capable of moving within the fluid in a manner whereby efficient cleaning of surfaces results.

The most preferred spacer fluid described above also preferably includes a thinner, dispersant and fluid loss control additive comprised of a mixture of 10% by volume polyvinyl pyrrolidone and 90% by volume of the sodium salt of naphthalene sulfonic acid condensed with formaldehyde present in the fluid in an amount in the range of from about 30 to about 170 lbs/1000 gals. of water, and barium sulfate weighting material present in the fluid in an amount sufficient to increase the density thereof to from about 8.8 to about 22 lbs/gal. Generally, an amount of barium sulfate weighting material in the range of from about 500 to about 3800 lbs/1000 gals. of water used is sufficient for this purpose. The resulting spacer fluid is compatible with all commonly used drilling fluids and cement compositions, is economical to prepare and brings about improved cleaning of well surfaces.

As stated above, the components of the aqueous well treating fluids of this invention can be premixed to form a blend of solids suitable for use as a single additive to water to form the aqueous treating fluids. This is particularly advantageous in that the blend can be premixed, bagged and stored until used, and when used, added directly to water in a simple mixing operation. As will be understood by those skilled in the art, the spacer fluid can be prepared "on the fly", i.e., continuously as the resulting aqueous treating fluid is introduced into a well bore, or the aqueous spacer fluid can be prepared and temporarily stored in truck tanks or other storage facilities until utilized. When the aqueous fluid is stored, some agitation is required to maintain solid materials in suspension.

A preferred blend of solids for use as an additive to water to form an aqueous spacer fluid is comprised of a first hydratable polymer selected from the group consisting of guar gum and derivatives thereof, cellulose and derivatives thereof and mixtures of such polymers present in the blend in an amount in the range of from about 1 to about 10 parts by weight per 100 parts of blend, a second hydratable polymer such as locust bean gum and mixtures of such polymers present in the blend in an amount in the range of from about 0.1 to about 4 parts by weight per 100 parts of blend, particulate walnut hulls having a size distribution in the range such that a major portion thereof passes through a size 14 mesh screen (U.S. Sieve Series) and is retained on a size 20 mesh screen present in the blend in an amount in the range of from about 5 to about 70 parts by weight per 100 parts of blend, barium sulfate present in the blend in an amount in the range of from about 5 to about 70 parts by weight per 100 parts of blend and a mixture of 10% by volume polyvinyl pyrrolidone and 90% by volume of the sodium salt of napthalene sulfonic acid condensed with formaldehyde present in the blend in an amount in the range of from about 2 to about 12 parts by weight per 100 parts of blend. The foregoing blend can be added directly to water to form an aqueous spacer fluid, and if desired, additional barium sulfate can be combined therewith to increase the density of the fluid.

In carrying out cementing and other similar well operations using the aqueous spacer fluid of this invention, the spacer fluid is injected by conventional techniques, either down the casing to drive drilling fluid contained therein up and out of the bore hole by way of the annulus, or down the annulus to drive drilling fluid up the inside of the casing. A sufficient quantity of spacer fluid is employed to separate the drilling fluid from the cement composition whereby the cement composition does not become contaminated by the drilling fluid. As the spacer fluid is introduced into the well ahead of the cement composition, filter cake on surfaces in the well are scrubbed from the surfaces by the angular particulate material contained in the spacer fluid thereby further preventing contamination, etc.

Because the aqueous treating fluids of this invention utilize water or brine as the base fluid, utilize components which are relatively economical and can be premixed in a blend of solids and can be prepared in a simple one-step mixing operation, they are economical to prepare and use. In addition, the spacer fluids of this invention are compatible with all fluids commonly used in drilling and completing wells and bring about an improved cleaning of surfaces.

In order to further illustrate the aqueous treating fluids and methods of the present invention, the following examples are given.

EXAMPLE 1

Quantities of aqueous treating fluid of this invention are prepared by mixing the components in the amounts given below with water.

| Component | Amount |
|---|---|
| Sodium carboxymethylhydroxyethyl-cellulose | 53.3 lbs/1000 gals. of water |
| Low residue hydroxypropyl guar | 26.6 lbs/1000 gals. of water |
| Locust bean gum (175 mesh U.S. Sieve Series) | 26.6 lbs/1000 gals. of water |
| Mixture of 10% by volume polyvinyl pyrrolidone and 90% by volume sodium salt of naphthalene sulfonic acid condensed with formaldehyde | 532.5 lbs/1000 gals. of water |
| Barium sulfate | 2289.7 lbs/1000 gals. of water |

Various quantities of various angular particulate materials are combined with the treating fluids and the resulting fluids are circulated with a centrifugal pump at a rate of approximately 3 gals/minute over drilling fluid filter cake for 5 minutes to determine the approximate amount of filter cake removed.

The filter cake is prepared by carrying out fluid loss tests on a drilling fluid in accordance with standard API methods. The filter cake produced is approximately 3/32 of an inch thick on filter paper. The filter paper is cut into portions measuring 0.875 inches by 2 inches and such portions are placed in a flow line parallel to the flow of treating fluid therethrough. The various aqueous treating fluids are flowed through the flow line for 2, 4 and 5 minutes and the removal of filter cake therefrom determined. The results of these tests are given in Table I below.

TABLE I

FILTER CAKE REMOVAL BY VARIOUS ANGULAR PARTICULATE MATERIAL

| Angular Particulate Material Utilized | Quantity, lbs/1000 Gals. Water | Specific Gravity | Size Distribution Screen Size (U.S. Sieve Series) Passed | Size Distribution Screen Size (U.S. Sieve Series) Retained | % Filter Cake Removed 2 Min. | % Filter Cake Removed 4 Min. | % Filter Cake Removed 5 Min. | Remarks |
|---|---|---|---|---|---|---|---|---|
| Walnut Hulls | 532.5 | 1.28 | 8 | 60 | 50 | 75 | 90 | Particles Partially Suspended |
| Hemitite Ore | 2103.3 | 5.02 | 30 | PAN | 85 | 95 | 98 | Particles Settled Rapidly |
| Gilsonite | 447.3 | 1.07 | 4 | 200 | 5 | 10 | 12 | Particles Floated to Top |
| Perlite[1] | 280.1 | 2.90 | 14 | PAN | 3 | 25 | 27 | Particles Floated to Top |
| Sand | 1091.6 | 263 | 20 | 40 | 2 | 5 | 8 | Particles Settled Extremely Fast |
| Sand | 1091.6 | 2.63 | 40 | 60 | 2 | 4 | 7 | Particles Settled Extremely Fast |

[1] 67–75% by volume silicon dioxide, 10–20% by volume oxide, 2–4% by volume water.

EXAMPLE 2

The procedure described in Example 1 is repeated except that walnut hulls of various size distributions are utilized as the angular particulate material. The results of these tests are set forth in Table II below.

TABLE II

FILTER CAKE REMOVAL BY VARIOUS SIZES OF PARTICULATED WALNUT HULLS

| Quantity of Walnut Hulls Used lbs/1000 gals. Water | Size Distribution Screen Size (U.S. Sieve Series) Passed | Size Distribution Screen Size (U.S. Sieve Series) Retained | % Filter Cake Removed 2 Min. | % Filter Cake Removed 4 Min. | % Filter Cake Removed 5 Min. | Remarks |
|---|---|---|---|---|---|---|
| 0 | — | — | 12 | 14 | 15 | — |
| 532.5 | 8 | 60 | 50 | 75 | 90 | Particles Partially Suspended |
| 532.5 | 8 | 14 | 12 | 14 | 15 | Particles Settled |
| 532.5 | 14 | 18 | 50 | 85 | 98 | Particles Suspended |
| 532.5 | 18 | 20 | 5 | 10 | 25 | Particles Suspended |

TABLE II-continued
FILTER CAKE REMOVAL BY VARIOUS SIZES OF PARTICULATED WALNUT HULLS

| Quantity of Walnut Hulls Used lbs/1000 gals. Water | Size Distribution Screen Size (U.S. Sieve Series) | | % Filter Cake Removed | | | Remarks |
|---|---|---|---|---|---|---|
| | Passed | Retained | 2 Min. | 4 Min. | 5 Min. | |
| 532.5 | 20 | 40 | 8 | 15 | 35 | Particles Suspended |

From Tables I and II above it can be seen that walnut hulls which have a specific gravity below about 2 are readily suspended and efficiently remove filter cake, and further, that particulate walnut hulls having a size distribution in the range of from that which passes through a 14 mesh screen and is retained on an 18 mesh screen achieves the best filter cake removal.

EXAMPLE 3

The procedure of Example 1 is repeated except that particulate walnut hulls are utilized as the angular material and the low residue hydroxypropyl guar quantities in the aqueous fluids are increased by the amounts shown in Table III below. In addition, the apparent viscosities and yield points of the fluids are determined. The results of these tests are shown in Table III below.

Viscosity measurements are taken from a direct reading Model 35 FANN VG meter using a No. 2 spring. The apparent viscosity is in units of consistency which are approximately equal to centipoises and is calculated as one-half the reading at 600 rpm. Yield point is calculated as the difference between twice the 300 rpm reading and the 600 rpm reading and is an indicator of the attraction between particles in the fluid in pounds per 100 square feet.

TABLE III
FILTER CAKE REMOVAL BY PARTICULATE WALNUT HULLS USING INCREASING AMOUNTS OF HYDRATABLE POLYMER

| Quantity of Particulate Walnut Hulls Used, lbs/1000 gals. Water | Size Distribution, Screen Size (U.S. Sieve Series) | | Quantity of Low Residue Hydroxypropyl Guar In Fluid, lbs/1000 gals. Water | % Filter Cake Removed | | | Apparent Viscosity of Fluid, Units of Consistency | Yield Point, lbs/ 100 sq. ft. | Remarks |
|---|---|---|---|---|---|---|---|---|---|
| | Passed | Retained | | 2 Min. | 4 Min. | 5 Min. | | | |
| 532.5 | 8 | 60 | 66.6 | 50 | 75 | 90 | 43 | 34 | Particles Partially Suspended |
| 532.5 | 8 | 60 | 79.9 | 3 | 5 | 10 | 73 | 72 | Particles Partially Suspended |
| 532.5 | 8 | 60 | 93.2 | 1 | 3 | 4 | 92 | 102 | Particles Partially Suspended |

From Table III it can be seen that if the viscosity of the aqueous fluid is too high, the angular particulate material cannot move adequately within the fluid to effectively remove filter cake.

EXAMPLE 4

Quantities of aqueous spacer fluid of this invention, a typical drilling fluid and a typical cement composition are prepared using brine (18% by weight sodium chloride) as the base fluid. The components and amounts thereof in the fluids and composition are as follows:

| Aqueous Spacer Fluid | |
|---|---|
| Component | Amount |
| Sodium carboxymethylhydroxyethyl-cellulose | 55.6 lbs/1000 gals. of brine |
| Low residue hydroxypropyl guar | 27.8 lbs/1000 gals. of brine |
| Locust bean gum (175 mesh) | 27.8 lbs/1000 gals. of brine |
| Mixture of 10% by volume polyvinyl pyrrolidone and 90% by volume sodium salt of naphthalene sulfonic acid condensed with formaldehyde | 166.7 lbs/1000 gals. of brine |
| Particulate walnut hulls | 555.6 lbs/1000 gals. of brine |
| Barium sulfate | 4000.00 lbs/1000 gals. of brine |

The density of the aqueous spacer fluid is 12 lbs/gal.

| Drilling Fluid | |
|---|---|
| Component | Amount |
| Attapulgite | 258.8 lbs/1000 gals. of brine |
| Starch | 77.6 lbs/1000 gals. of brine |
| Barium sulfate | 3079.7 lbs/1000 gals. of brine |

The density of the drilling fluid is 11.5 lbs/gal.

| Cement Composition | |
|---|---|
| Component | Amount |
| Lone Star Class H Cement | 18076.9 lbs/1000 gals. of brine |

The density of the cement composition is 15.9 lbs/gal.

The above-described drilling fluid is contaminated by combining various quantities of the aqueous spacer fluid therewith and the rheological properties of the contaminated drilling fluid determined. The results of these tests are given in Table IV below.

TABLE IV
Drilling Fluid Cotaminated with Various Quantities of Aqueous Spacer Fluid

| Temperature °F. | 72 | | | | | 150 |
|---|---|---|---|---|---|---|
| Percent Contamination by Volume | 0 | 10 | 30 | 50 | 100 | 100 |
| Apparent Viscosity (cp) | 17 | 20 | 27 | 29 | 40 | 24 |
| 600 Reading | 34 | 40 | 54 | 58 | 80 | 48 |
| 300 Reading | 30 | 26 | 32 | 38 | 54 | 32 |
| 200 Reading | 26 | 20 | 22 | 28 | 42 | 22 |
| 100 Reading | 22 | 14 | 28 | 18 | 27 | 14 |
| 6 Reading | 14 | 7 | 6 | 6 | 6 | 4 |
| 3 Reading | 12 | 6 | 4 | 5 | 5 | 3 |

TABLE IV-continued

| Drilling Fluid Contaminated with Various Quantities of Aqueous Spacer Fluid | | | | | | |
|---|---|---|---|---|---|---|
| Temperature °F. | | 72 | | | | 150 |
| Percent Contamination by Volume | 0 | 10 | 30 | 50 | 100 | 100 |
| Apparent Viscosity (cp) | 17 | 20 | 27 | 29 | 40 | 24 |
| Plastic Viscosity (cp) | 4 | 14 | 22 | 20 | 26 | 16 |
| Yield Point (lb/100 sq ft) | 26 | 12 | 10 | 18 | 28 | 16 |

The aqueous spacer fluid is contaminated with cement composition by combining various quantities of cement composition therewith and the rheological properties of the contaminated aqueous treating fluid determined. The results of these tests are given in Table V below.

TABLE V

| Aqueous Spacer Fluid Contaminated with Various Quantities of Cement Composition | | | | | | |
|---|---|---|---|---|---|---|
| Temperature °F. | | 72 | | | | 150 |
| Percent Contamination by Volume | 0 | 10 | 30 | 50 | 100 | 100 |
| Apparent Viscosity (cp) | 82 | 84 | 90 | 86 | 74 | 30 |
| 600 Reading | 164 | 168 | 180 | 172 | 148 | 60 |
| 300 Reading | 116 | 116 | 128 | 126 | 100 | 32 |
| 200 Reading | 94 | 96 | 104 | 104 | 78 | 22 |
| 100 Reading | 62 | 64 | 70 | 72 | 54 | 12 |
| 6 Reading | 10 | 12 | 12 | 12 | 16 | 2 |
| 3 Reading | 7 | 8 | 8 | 8 | 12 | 1 |
| Plastic Viscosity (cp) | 48 | 52 | 52 | 46 | 48 | 28 |
| Yield Point (lb/100 sq ft) | 68 | 64 | 76 | 80 | 52 | 4 |

EXAMPLE 5

The procedure described in Example 4 above is repeated except that water containing potassium chloride in the amounts given below is utilized and the following aqueous treating fluid, drilling fluid and cement composition are used.

| Aqueous Spacer Fluid | |
|---|---|
| Component | Amount |
| KCl | 304.9 lbs/1000 gals. of water |
| Sodium carboxymethylhydroxyethyl-cellulose | 58.1 lbs/1000 gals. of water |
| Low residue hydroxypropyl guar | 29.0 lbs/1000 gals. of water |
| Locust bean gum (175 mesh) | 29.0 lbs/1000 gals. of water |
| Mixture of 10% by volume polyvinyl pyrrolidone and 90% by volume sodium salt of naphthalene sulfonic acid condensed with formaldehyde | 174.2 lbs/1000 gals. of water |
| Particulate walnut hulls | 580.7 lbs/1000 gals. of water |
| Barium sulfate | 580.7 lbs/1000 gals. of water |
| The density of the aqueous spacer fluid is 12 lbs/gal. | |

| Drilling Fluid | |
|---|---|
| Component | Amount |
| KCl | 284.1 lbs/1000 gals. of water |
| Attapulgite | 324.7 lbs/1000 gals. of water |
| Starch | 54.1 lbs/1000 gals. of water |
| Barium sulfate | 4734.9 lbs/1000 gals. of water |
| The density of the drilling fluid is 11.5 lbs/gal. | |

| Cement Composition | |
|---|---|
| Component | Amount |
| KCl | 542.3 lbs/1000 gals. of water |
| Lone Star Class H cement | 18076.9 lbs/1000 gals. of water |
| The density of the cement composition is 15.6 lbs/gal. | |

The results of these tests are given in Tables VI and VII below.

TABLE VI

| Drilling Fluid Contaminated with Various Quantities of Aqueous Spacer Fluid | | | | | | |
|---|---|---|---|---|---|---|
| Temperature °F. | | 72 | | | | 150 |
| Percent Contamination by Volume | 0 | 10 | 30 | 50 | 100 | 100 |
| Apparent Viscosity (cp) | 31 | 28 | 28 | 32 | 40 | 28 |
| 600 Reading | 62 | 56 | 56 | 64 | 80 | 56 |
| 300 Reading | 54 | 36 | 36 | 42 | 56 | 38 |
| 200 Reading | 50 | 30 | 30 | 34 | 46 | 30 |
| 100 Reading | 42 | 22 | 20 | 22 | 30 | 20 |
| 6 Reading | 20 | 12 | 6 | 6 | 6 | 4 |
| 3 Reading | 19 | 10 | 5 | 5 | 5 | 3 |
| Plastic Viscosity (cp) | 8 | 20 | 20 | 22 | 24 | 18 |
| Yield Point (lb/100 sq ft) | 46 | 16 | 16 | 20 | 32 | 20 |

TABLE VII

| Aqueous Spacer Fluid Contaminated with Various Quantities of Cement Composition | | | | | | |
|---|---|---|---|---|---|---|
| Temperature °F. | | 72 | | | | 150 |
| Percent Contamination by Volume | 0 | 10 | 30 | 50 | 100 | 100 |
| Apparent Viscosity (cp) | 67 | 73 | 75 | 78 | 78 | 40 |
| 600 Reading | 134 | 146 | 150 | 156 | 156 | 80 |
| 300 Reading | 96 | 90 | 110 | 111 | 104 | 46 |
| 200 Reading | 79 | 92 | 92 | 90 | 80 | 32 |
| 100 Reading | 54 | 68 | 64 | 62 | 56 | 20 |
| 6 Reading | 12 | 14 | 14 | 12 | 8 | 3 |
| 3 Reading | 6 | 10 | 10 | 8 | 6 | 2 |
| Plastic Viscosity (cp) | 38 | 56 | 40 | 45 | 52 | 34 |
| Yield Point (lb/100 sq ft) | 58 | 34 | 70 | 66 | 52 | 12 |

The measurements given in Tables IV, V, VI and VII above are taken from a direct reading Model 35 FANN VG meter using a No. 2 spring. The apparent viscosity is in units of consistency which are approximately equal to centipoises and is calculated as one-half the reading at 600 rpm. Plastic viscosity is calculated as the difference between 600 rpm and the 300 rpm readings. Yield point is calculated as the difference between twice the 300 rpm reading and the 600 rpm reading and is an indicator of the attraction between particles in the fluid in pounds per 100 square feet.

From Tables IV-VII above it can be seen that the aqueous spacer fluids of this invention can include either sodium chloride or potassium chloride and that the aqueous spacer fluids have good compatibility with drilling fluids and cement compositions containing sodium chloride or potassium chloride.

EXAMPLE 6

A blend of spacer fluid solids is prepared as follows:

| Component | Amount (parts by weight per 100 parts of blend) |
|---|---|
| Sodium carboxymethylhydroxyethyl-cellulose | 4 |
| Low residue hydroxypropyl guar | 2 |

| Component | Amount (parts by weight per 100 parts of blend) |
| --- | --- |
| Locust Bean Gum (175 mesh) | 2 |
| Mixture of 10% by volume polyvinyl pyrrolidone and 90% by volume sodium salt of naphthalene sulfonic avid condensed with formaldehyde | 12 |
| Particulate walnut hulls (−14 mesh−+18 mesh) | 40 |
| Barium sulfate | 40 |

The above blend of solids is mixed with various quantities of water and additional barium sulfate to produce aqueous spacer fluids of various densities. The rheological properties of each of the fluids at various temperatures are determined in accordance with the procedure described in Example 4 above. The results of these tests are given in Table VIII below.

TABLE VIII
RHEOLOGICAL PROPERTIES OF AQUEOUS SPACER FLUIDS OF VARIOUS DENSITIES

| | | | | | | | | | | | | | | | | |
| --- | --- | --- | --- | --- | --- | --- | --- | --- | --- | --- | --- | --- | --- | --- | --- | --- |
| Density of Fluid | 8.79 | | | | 10.0 | | | | 15.0 | | | | 20.0 | | | |
| Lbs. of Solids Blend per 1000 Gals. Water Used | 1266.5 | | | | 1331.2 | | | | 1411.0 | | | | 1102.3 | | | |
| Additional Barium Sulfate Added, lbs/1000 Gals. Water Used | 0 | | | | 66 | | | | 346 | | | | 630 | | | |
| Temperature, °F. | 72 | 120 | 150 | 190 | 72 | 120 | 150 | 190 | 72 | 120 | 150 | 190 | 72 | 130 | 150 | 190 |
| Apparent Viscosity (cp) | 33 | 23 | 22 | 19 | 43 | 28 | 28 | 28 | 122 | 89 | 74 | 70 | 264 | 156 | 142 | 130 |
| 600 rpm Reading | 65 | 46 | 43 | 38 | 86 | 56 | 56 | 56 | 244 | 177 | 147 | 140 | 528 | 312 | 284 | 260 |
| 300 rpm Reading | 44 | 31 | 28 | 27 | 60 | 36 | 36 | 37 | 165 | 116 | 97 | 92 | 320 | 186 | 170 | 160 |
| 200 rpm Reading | 34 | 24 | 22 | 19 | 46 | 30 | 28 | 29 | 133 | 88 | 73 | 69 | 240 | 148 | 138 | 120 |
| 100 rpm Reading | 22 | 15 | 14 | 12 | 32 | 20 | 18 | 17 | 86 | 55 | 46 | 43 | 144 | 84 | 78 | 74 |
| 6 rpm Reading | 3 | 2 | 2 | 2 | 6 | 4 | 4 | 4 | 12 | 7 | 5 | 6 | 9 | 12 | 12 | 12 |
| 3 rpm Reading | 2 | 1 | 1 | 1 | 4 | 2 | 3 | 3 | 8 | 4 | 3 | 3 | 6 | 8 | 8 | 8 |
| Plastic Viscosity (cp) | 21 | 15 | 15 | 11 | 26 | 20 | 20 | 19 | 79 | 61 | 50 | 48 | 208 | 126 | 114 | 100 |
| Yield Point (lbs/100 sq. ft.) | 23 | 16 | 13 | 16 | 34 | 16 | 16 | 18 | 86 | 55 | 47 | 44 | 112 | 60 | 56 | 60 |

From Table VIII it can be seen that the aqueous spacer fluids of this invention have good rheological properties over a broad temperature range.

What is claimed is:

1. A blend of solids for use as an additive to water to form an aqueous spacer fluid for treating a well, said blend comprising:

an angular particulate material for scrubbing surfaces in said well, wherein said angular material has a specific gravity below about 2 and is selected from the group consisting of nut hulls, perlite fly ash, coal, lignite, and mixtures thereof and wherein said particulate material has a size distribution such that a major portion of said material passes through a 14 mesh screen and is retained on a 20 mesh screen;

a barium sulfate weighting material to increase the density of the fluid;

a first hydratable polymer for increasing the viscosity of said fluid at temperatures within a first lower range of about ambient −150° F. to a level whereby said angular particulate material is substantially suspended in said fluid, wherein said first hydratable polymer is selected from the group consisting of guar gum and derivatives thereof, cellulose and derivatives thereof, and mixtures of such polymers in an amount of about 1 to 10 parts per 100 parts by weight of said blend; and locust bean gum as a second hydratable polymer for maintaining the viscosity of said fluid at said level whereby said angular particulate material is substantially suspended in said fluid at temperatures with a second higher range of about 150° to 300° F., wherein said second hydratable polymer is present in an amount of about 0.1 to 4 parts per 100 parts by weight of said blend.

2. A blend of claim 1 containing salt selected from the group consisting of sodium chloride, potassium chloride or combinations thereof.

3. The blend of solids of claim 1 which is further characterized to include at least one fluid loss control additive therein.

4. The blend of solids of claim 3 wherein said fluid loss control additive is a mixture of about 10% by volume polyvinyl pyrrolidone and about 90% by volume of the sodium salt of naphthalene sulfonic acid condensed with formaldehyde present in said blend in an amount in the range of about 2–12 parts per 100 parts by weight of said blend.

5. A blend of solids for use as an additive to water to form an aqueous spacer fluid for treating a well, said blend comprising:

an angular particulate material for scrubbing surfaces in said well comprising nut hulls having a specific gravity. below about 2 and a size distribution in the range such that a major portion of said material passes through a size 14 mesh screen (U.S. Sieve Series) and is retained on a size 20 mesh screen present in said blend in an amount of about 5–70 parts per 100 parts by weight of said blend;

a first hydratable polymer for increasing the viscosity of said fluid at temperatures within a first lower range of about ambient −150° F. to a level whereby said angular particulate material is substantially suspended in said fluid, wherein said first hydratable polymer is selected from the group consisting of guar gum and derivatives thereof, cellulose and derivatives thereof, and mixtures of such polymers present in said blend in an amount of about 1–10 parts per 100 parts by weight of said blend;

a second hydratable polymer for maintaining the viscosity of said fluid at said level whereby said angular particulate material is substantially suspended in said fluid at temperatures within a second higher range of about 150°-300° F., wherein said second hydratable polymer is locust bean gum present in said blend in an amount in the range of about 0.1-4 parts per 100 parts by weight of said blend; and a weighting material to increase the density of the fluid formed, wherein said weighting material is barium sulfate present in said blend in an amount of about 5-70 parts per 100 parts by weight of said blend.

6. The blend of solids of claim 5 which is further characterized to include at least one fluid loss control additive therein.

7. The blend of solids of claim 6 wherein said fluid loss control additive is a mixture of 10% by volume polyvinyl pyrrolidone and 90% by volume of the sodium salt of napthalene sulfonic acid condensed with formaldehyde present in said blend in an amount in the range of from about 2 to about 12 parts by weight per 100 parts of said blend.

8. An aqueous spacer fluid for use in cementing a well comprising:

water;

an angular particulate material leaving a specific gravity below about 2 and a size distribution in the range such that a major portion of said material passes through a size 14 mesh screen (U.S. Sieve Series) and is retained on a size 20 mesh screen, present in an amount of about 300-510 lbs/1000 gals. of water;

sodium carboxymethyl hydroxyethyl cellulose present in said fluid in an amount of about 30-51 lbs/1000 gals. of water for increasing the viscosity of said fluid to a desired level at temperatures within a first lower temperature range of about ambient −150° F.; hydroxypropyl guar present in said fluid in an amount of about 15-26 lbs/1000 gals. of water;

locust bean gum present in said fluid in an amount of about 15-26 lbs/1000 gals. of water for maintaining the viscosity of said fluid at said desired level at temperature within a second higher range of about 150°-300° F.; and a fluid loss control additive comprisiing a mixture of about 10% by volume polyvinyl pyrrolidone and about 90% by volume sodium salt of naphthalene sulfonic acid condensed with formaldehyde present in an amount of about 30-170 lbs/1000 gals. of water.

9. An aqueous spacer fluid for use in cementing a well comprising:

water;

an angular particulate material having a specific gravity below about 2 and a size distribution in the range such that a major portion of said material passes through a size 14 mesh screen (U.S. Sieve Series) and is retained on a size 20 mesh screen, present in said fluid in an amount of about 300-510 lbs/1000 gals. of water.

sodium carboxyl methyl hydroxyl ethyl cellulose present in said fluid in an amount of about 30-51 lbs/1000 gals. of water for increasing the viscosity of said fluid to a desired level at temperatures within a first lower range of about ambient −150° F.;

hydroxypropyl guar present in said fluid in an amount of about 15-26 lbs/1000 gals. of water;

locust bean gum present in said fluid in an amount of about 15-26 lbs/1000 gals. of water for maintaining the viscosity of said fluid at said desired level at temperatures within a second higher range of about 150°-300° F.;

a fluid loss control additive comprising a mixture of about 10% by volume polyvinyl pyrrolidone and about 90% by volume sodium salt of naphthalene sulfonic acid condensed with formaldehyde present in an amount of about 30-170 lbs/1000 gals. of water; and barium sulfate weighting material present in said fluid in an amount of about 500-3800 lbs/1000 gals. of water.

* * * * *

UNITED STATES PATENT AND TRADEMARK OFFICE
CERTIFICATE OF CORRECTION

PATENT NO. : 4,302,341

DATED : November 24, 1981

INVENTOR(S) : JIMMIE L. WATSON

It is certified that error appears in the above—identified patent and that said Letters Patent is hereby corrected as shown below:

Column 6, Line 46, footnote to Table I, after "by volume" insert --aluminum--.

Signed and Sealed this

Eighteenth Day of May 1982

[SEAL]

Attest:

GERALD J. MOSSINGHOFF

Attesting Officer

Commissioner of Patents and Trademarks